(12) United States Patent
Ohtomo et al.

(10) Patent No.: US 10,707,518 B2
(45) Date of Patent: Jul. 7, 2020

(54) METHOD OF PRODUCING A SULFIDE SOLID ELECTROLYTE MATERIAL, SULFIDE SOLID ELECTROLYTE MATERIAL, AND LITHIUM BATTERY

(71) Applicant: TOYOTA JIDOSHA KABUSHIKI KAISHA, Toyota-shi, Aichi-ken (JP)

(72) Inventors: Takamasa Ohtomo, Susono (JP); Koji Kawamoto, Miyoshi (JP); Shigenori Hama, Susono (JP); Yuki Kato, Susono (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days.

(21) Appl. No.: 15/984,916

(22) Filed: May 21, 2018

(65) Prior Publication Data
US 2018/0269521 A1    Sep. 20, 2018

Related U.S. Application Data

(62) Division of application No. 13/516,496, filed as application No. PCT/IB2010/003404 on Dec. 15, 2010, now Pat. No. 10,008,735.

(30) Foreign Application Priority Data

Dec. 16, 2009    (JP) ................................. 2009-285275

(51) Int. Cl.
*H01M 10/052*    (2010.01)
*H01M 10/0562*    (2010.01)

(52) U.S. Cl.
CPC ..... *H01M 10/052* (2013.01); *H01M 10/0562* (2013.01)

(58) Field of Classification Search
CPC ........................................ H01M 10/052–0562
See application file for complete search history.

(56) References Cited

U.S. PATENT DOCUMENTS

| 4,599,284 A | 7/1986 | Akridge |
| 5,217,826 A * | 6/1993 | Yamamura ................ C03C 3/16 |
| | | 252/500 |

(Continued)

FOREIGN PATENT DOCUMENTS

| CN | 1790780 A | 6/2006 |
| EP | 0 618 632 A1 | 10/1994 |

(Continued)

OTHER PUBLICATIONS

Appendix submitted with the IDS filed Aug. 29, 2013 in parent U.S. Appl. No. 13/516,496; 1 page.

(Continued)

*Primary Examiner* — Osei K Amponsah
(74) *Attorney, Agent, or Firm* — Sughrue Mion, PLLC

(57) ABSTRACT

A method of producing a sulfide solid electrolyte material includes: forming an intermediate having crosslinking sulfur but no $Li_2S$, by vitrifying, in a first vitrification process, a starting material composition obtained by mixing $Li_2S$ and a sulfide of a group 14 or group 15 element such that a proportion of $Li_2S$ with respect to the sum total of the $Li_2S$ and the sulfide of a group 14 or group 15 element is smaller than a proportion of $Li_2S$ required for the sulfide solid electrolyte material to obtain an ortho composition; and eliminating the crosslinking sulfur by vitrifying, in a second vitrification process, an intermediate-containing composition resulting from mixing a bond cleaving compound, which cleaves a bond of the crosslinking sulfur, with the intermediate.

5 Claims, 7 Drawing Sheets

(56) References Cited

U.S. PATENT DOCUMENTS

| | | | |
|---|---|---|---|
| 6,322,929 | B1 | 11/2001 | Takada et al. |
| 6,428,935 | B1 * | 8/2002 | Takada .................. H01M 4/13 429/218.1 |
| 2006/0147806 | A1 | 7/2006 | Kugai et al. |
| 2007/0160911 | A1 | 7/2007 | Senga et al. |
| 2008/0081257 | A1 | 4/2008 | Yoshida et al. |
| 2010/0297479 | A1 | 11/2010 | Tsuchida et al. |
| 2011/0108642 | A1 | 5/2011 | Hama et al. |
| 2011/0167625 | A1 | 7/2011 | Hama et al. |
| 2012/0301796 | A1 | 11/2012 | Ohtomo et al. |
| 2013/0164631 | A1 | 6/2013 | Ohtomo et al. |

FOREIGN PATENT DOCUMENTS

| | | |
|---|---|---|
| EP | 0 933 827 A1 | 8/1999 |
| EP | 1 365 470 A1 | 11/2003 |
| JP | 62-82665 A | 4/1987 |
| JP | 05-306117 | 11/1993 |
| JP | 05-310417 A | 11/1993 |
| JP | 06-070905 B2 | 9/1994 |
| JP | 11-219722 A | 8/1999 |
| JP | 2001-328816 A | 11/2001 |
| JP | 2002-109955 A | 4/2002 |
| JP | 2002-329524 A | 11/2002 |
| JP | 2003-206111 A | 7/2003 |
| JP | 2004-265685 A | 9/2004 |
| JP | 2009-193727 | 8/2009 |
| JP | 2009-193802 A | 8/2009 |
| JP | 2009-283344 A | 12/2009 |
| JP | 2010-040511 | 2/2010 |
| WO | 2000/028608 A1 | 5/2000 |
| WO | 2010/038313 A1 | 4/2010 |

OTHER PUBLICATIONS

Notice of Allowance, dated Oct. 16, 2018, issued by the U.S. Patent and Trademark Office in U.S. Appl. No. 14/876,379.

Office Action dated Jun. 15, 2018, which issued during the prosecution of U.S. Appl. No. 14/876,379.

21-Seiki no Lithium Nijidenchi Gijyutsu (Lithium Secondary Battery Technology in 21st Century).

Communication dated Feb. 1, 2016, from the U.S. Patent and Trademark Office in U.S. Appl. No. 13/818,495.

Communication dated Jun. 12, 2015, from the U.S. Patent and Trademark Office in U.S. Appl. No. 13/818,495.

Communication dated Nov. 10, 2015, from the U.S. Patent and Trademark Office in U.S. Appl. No. 13/818,495.

Communication dated Nov. 16, 2017, from the U.S. Patent and Trademark Office in U.S. Appl. No. 14/876,379.

Adachi et al.: "Lithium Ion Dendotai to Sono Ouyou (Lithium Ion Conductor and its Application)," Ceramics, 1992, vol. 27, No. 2, pp. 117-121.

Hayashi et al., "Preparation of $Li_2S$—$P_2S_5$ amorphous solid electrolytes by Mechanimcal Milling", J. Am. Ceram. Soc., 84(2):477-479 (2001).

International Search Report and Written Opinion for corresponding International Patent Application No. PCT/IB2010/003404 dated Jun. 8, 2011.

Japanese Office Action for JP Patent Application No. 2009-285275 dated Nov. 28, 2011.

Suh et al.: "11B NMR studies of the local environment of boron in $B_2S_3$—$Li_2S$—LiI glasses", Journal of Non-Crystalline Solids, 1991; vol. 128, pp. 13-17.

Machida et al.: "Mechano-chemical Synthesis of Lithium Ion Conducting Materials in the System $Li_2O$—$Li_2S$—$P_2S_5$", J.Ppn.Soc. Powder Powder Metallurgy, vol. 51, No. 2, pp. 91-97, Dec. 12, 2003.

Tatsumisago et al.: "Lithium Ion Dendosei Kesshoka Glass (Lithium Ion Conductive Crysallized Glass," Ceramics, 2008, vol. 43, No. 12, pp. 1051-1054.

Menetrier et al., "Ionic conduction in $B_2S_3$—$Li_2S$—LiI glasses", Solid State Ionics, 1992, vol. 53-56 pp. 1208-1213 (6 pages total).

Minami et al.: "Electrical and electrochemical properties of the $70Li_2S.(30-x)P_2S_5.xP_2O_5$ glass ceramic electrolytes", Solid Stage Ionics 179 (2008), pp. 1282-1285.

Minami et al.: "Structure and properties of the $70Li_2S . (30-x)P_2S_5 . xP_2O_5$ oxysulfide glasses and glass ceramics", Journal of Non-Crystalline Solids 354 (2008), pp. 370-373.

Mizuno et al.: "Structure and Ionic Conductivity of $Li_2S$—$P_2S_5$—$P_2O_5$ Glasses and Glass-Ceramics Prepared by Mechanical Milling", Journal of the Ceramic Society of Japan, Supplement 112-1, Special Issue, 112[5] pp. 709-712 (2004).

Ohtomo et al.: "Electrical and electrochemical properties of $Li_2S$—$P_2S_5$-$P_2O_5$ glass-ceramic electrolytes", Journal of Power Sources 146 (2005), pp. 715-718.

Rao et al.: "Oxysulfide glasses $xLi_2O$-$(1-x)(0.6Li_2S$-$0.4P_2S_5)$", Journal of Power Sources 159 (2006), pp. 258-262.

Ujiie et al.: "Preparation and ionic conductivity of $(100-x) (0.0Li_2S$-$0.2p_2S_5)0xLiI$ glass-ceramic electrolytes," Journal of Solid State Electrochemistry, Oct. 2012.

Ujiie et al.: "Structure, ionic conductivity and electrochemical stability of $Li_2S$—$P_2S_5$—LiI-glass and glass-ceramic electrolytes," Solid State Ionics, 2012, vol. 211, pp. 42-45.

Takada et al.: "Lithium ion conductive oxysulfide, $Li_3PO_4$—$Li_3PS_4$", Solid State Ionics 176 (2005), pp. 2355-2359.

Ohtomo et al., Characteristics of the $Li_2O$—$Li_2S$—$P_2S_5$ glasses synthesized by the two-step mechanical milling, Journal of Non=Crystalline solids 364 (2013), pp. 57-61.

Tatsumisago et al., "New lithium ion conducting glass-ceramics prepared from mechanochemical $Li_2S$—$P_2S_5$ glasses", Solid State Ionics, 154-155:635-640 (2002).

Tomei et al., "Preparation of Amorphous Materials in the system LiI—$Li_2S$—$P_2S_5$ by Mechanical Milling and their lithium Ion Conducting Properties", Summary of Solid State Ionics Symposium, 23:26-27 (2003).

Visco et al., "Complex Plane and Li NMR Studies of Highly Conductive Sulfide-Based Lithium Glasses" Journal of Electrochemical Society, Apr. 1985. vol. 132, No. 4, pp. 751-753.

Appendix.

* cited by examiner

EXAMPLES 1 to 3

COMPARATIVE EXAMPLES 1 to 3

COMPARATIVE EXAMPLES 3 (x=0.25)

COMPARATIVE EXAMPLES 4 (75Li2S-25P2S5)

METHOD OF PRODUCING A SULFIDE SOLID ELECTROLYTE MATERIAL, SULFIDE SOLID ELECTROLYTE MATERIAL, AND LITHIUM BATTERY

CROSS REFERENCE TO RELATED APPLICATIONS

This is a divisional of application Ser. No. 13/516,496, filed Jun. 15, 2013, which is the National Stage of PCT/IB2010/003404, filed Dec. 15, 2010, and which claims benefit of priority of Japanese Patent Application No. JP 2009-285275, filed Dec. 16, 2009; the above noted prior applications are all hereby incorporated by reference

BACKGROUND OF THE INVENTION

1. Field of the Invention

The invention relates to a method of producing a sulfide solid electrolyte material that generates an extremely small amount of hydrogen sulfide.

2. Description of the Related Art

The rapid diffusion of information-related devices and communication devices such as personal computers, video cameras, cell phones and the like in recent years has been accompanied by efforts directed at developing batteries to be used as power sources in the foregoing devices. Meanwhile, high-output and high-capacity batteries for electric automobiles and hybrid automobiles are the subject of ongoing research in the automotive industry. At present, lithium batteries are predominant among various types of battery, thanks to their high energy density.

Current commercially available lithium batteries use electrolyte solutions that contain combustible organic solvents. As a result, safety devices that suppress rises in temperature during short-circuits must be fitted to the battery, and also improvements in production and materials are called for in order to prevent short-circuits. By contrast, lithium batteries that are all-solid-state batteries, by changing the electrolyte solution into a solid electrolyte layer, employ no combustible organic solvent inside the battery, and arguably make for simpler safety devices, while being superior in terms of production costs and productivity. Sulfide solid electrolyte materials are conventional solid electrolyte materials that are employed in such solid electrolyte layers.

Sulfide solid electrolyte materials are useful for achieving higher battery outputs thanks to their high lithium (Li) ion conductivity, and research is being conducted on related technologies. For instance, Nobuya Machida et al., "Mechano-chemical Synthesis of Lithium Ion Conducting Materials in the System $Li_2O$—$Li_2S$—$P_2S_5$", J. Jpn. Soc. Powder Metallurgy Vol. 51, No. 2, 91-97 disclose a glassy Li ion conductive material wherein part of $Li_2S$ in $75Li_2S$-$25P_2S_5$ is replaced by $Li_2O$. Also, R. Prasada Rao et al., "Oxysulfide glasses $xLi_2O$-$(1-x)(0.6Li_2S$-$0.4P_2S_5)$", Journal of Power Sources 159 (2006) 258-262, discloses a glassy Li ion conductive body represented by $40Li_2O$-$36Li_2S$-$24P_2S_5$ (in this composition, the material satisfies $x=40$ in $xLi_2O$-$(1-x)(60Li_2S$-$40P_2S_5)$) and that is produced by mechanical milling. In both technologies, a Li ion conductive body is produced in one single vitrification process (mechanical milling process).

Sulfide solid electrolyte materials are advantageous in terms of high Li ion conductivity, but, on the other hand, are problematic in that they generate hydrogen sulfide when coming into contact with water (such as moisture, likewise hereafter). Against this background, the inventors have found that the amount of generated hydrogen sulfide can be reduced by adjusting the composition of a sulfide solid electrolyte material to an ortho composition. The term ortho composition denotes ordinarily the most highly hydrated oxoacid from among the oxoacids that are obtained through hydration of one same oxide. In the sulfide solid electrolyte material having $Li_2S$, however, the ortho composition denotes a composition having a crystal composition with the greatest amount of $Li_2S$ added among the sulfides. In a $Li_2S$—$P_2S_5$ material, for instance, $Li_3PS_4$ corresponds to the ortho composition, such that a sulfide solid electrolyte material of ortho composition is obtained when mixing starting materials in a proportion $Li_2S:P_2S_5=75:25$, on a molar basis. Although a sulfide solid electrolyte material having an ortho composition has a lower amount of generated hydrogen sulfide than a sulfide solid electrolyte material other than of ortho composition, the sulfide solid electrolyte material releases nonetheless small amounts of hydrogen sulfide, and drops in Li ion conductivity have been observed. Therefore, hydrogen sulfide generation must be reduced further still in order to increase the stability of the sulfide solid electrolyte material.

SUMMARY OF THE INVENTION

The invention provides a method of producing a sulfide solid electrolyte material that generates a very small amount of hydrogen sulfide.

A first aspect of the invention relates to a method of producing a sulfide solid electrolyte material, characterized by including: forming an intermediate having crosslinking sulfur but no $Li_2S$, by vitrifying, in a first vitrification process, a starting material composition obtained by mixing $Li_2S$ and a sulfide of a group 14 or group 15 element such that a proportion of $Li_2S$ with respect to the sum total of the $Li_2S$ and the sulfide of a group 14 or group 15 element is smaller than a proportion of $Li_2S$ required for the sulfide solid electrolyte material to obtain an ortho composition; and eliminating the crosslinking sulfur by vitrifying, in a second vitrification process, an intermediate-containing composition resulting from mixing a bond cleaving compound, which cleaves a bond of the crosslinking sulfur, with the intermediate.

In the above configuration, an intermediate from which $Li_2S$ is removed is formed in the first vitrification step, while crosslinking sulfur in the intermediate is removed in the second vitrification step. A sulfide solid electrolyte material can be obtained as a result that is free of both $Li_2S$ and crosslinking sulfur. It becomes possible thereby to obtain a highly safe sulfide solid electrolyte material that generates a very small amount of hydrogen sulfide.

In the production method according to the present aspect, the proportion in which the bond cleaving compound is mixed with the intermediate may be a proportion at which a sulfide solid electrolyte material substantially free of crosslinking sulfur is obtained. This feature allows suppressing generation of hydrogen sulfide caused by reaction between the crosslinking sulfur and water.

In the production method according to the present aspect, the bond cleaving compound may be $Li_2O$. By virtue of the above feature, the oxygen (O) element in $Li_2O$ can cleave with good efficiency the crosslinking sulfur in the intermediate. Also, hydrogen sulfide is not generated even in the presence of unreacted $Li_2O$ having been added in excess.

In the production method according to the present aspect, the sulfide of a group 14 or group 15 element may be $P_2S_5$; and in the starting material composition, the proportion of the $Li_2S$ with respect to the sum total of the $Li_2S$ and the $P_2S_5$ may be smaller than 75%, on a molar basis.

In the production method according to the present aspect, the proportion of the sum total of the $Li_2S$ and the $Li_2O$ with respect to the sum total of the $Li_2S$, the $P_2S_5$ and the $Li_2O$ in the intermediate-containing composition may be not smaller than 75%, on a molar basis. The above feature allows obtaining a sulfide solid electrolyte material substantially free of crosslinking sulfur.

In the production method according to the present aspect, the sulfide of a group 14 or group 15 element may be $GeS_2$; and in the starting material composition, the proportion of the $Li_2S$ with respect to the sum total of the $Li_2S$ and the $GeS_2$ may be smaller than 66.7%, on a molar basis.

In the production method according to the present aspect, the proportion of the sum total of the $Li_2S$ and the $Li_2O$ with respect to the sum total of the $Li_2S$, the $GeS_2$ and the $Li_2O$ in the intermediate-containing composition may be not smaller than 66.7%, on a molar basis. The above feature allows obtaining a sulfide solid electrolyte material substantially free of crosslinking sulfur.

In the production method according to the present aspect, the sulfide of a group 14 or group 15 element may be $SiS_2$; and in the starting material composition, the proportion of the $Li_2S$ with respect to the sum total of the $Li_2S$ and the $SiS_2$ may be smaller than 66.7%, on a molar basis.

In the production method according to the present aspect, the proportion of the sum total of the $Li_2S$ and the $Li_2O$ with respect to the sum total of the $Li_2S$, the $SiS_2$ and the $Li_2O$ in the intermediate-containing composition may be not smaller than 66.7%, on a molar basis. The above feature allows obtaining a sulfide solid electrolyte material substantially free of crosslinking sulfur.

In the production method according to the present aspect, the first vitrification process may be mechanical milling. The above feature enables processing at normal temperature and allows streamlining the production process.

In the production method according to the present aspect, the second vitrification process may be mechanical milling. The above feature enables processing at normal temperature and allows streamlining the production process.

A second aspect of the invention relates to a sulfide solid electrolyte material that contains Li, a group 14 or group 15 element, O and S, is substantially free of crosslinking sulfur, and has a $Li_2S$ content no greater than 1 mol %.

In the above configuration, $Li_2S$ content is low. A sulfide solid electrolyte material that generates a very small amount of hydrogen sulfide can be obtained as a result.

In the sulfide solid electrolyte material according to the present aspect, the group 14 or group 15 element may be P, and the sulfide solid electrolyte material according to the present aspect may be produced by vitrifying $Li_2S$, $P_2S_5$ and $Li_2O$.

In the sulfide solid electrolyte material according to the present aspect, $Li_2O$ may form a phase. This feature allows obtaining a sulfide solid electrolyte material having yet better Li ion conductivity.

A third aspect of the invention relates to a lithium battery that has a positive electrode active material layer containing a positive electrode active material; a negative electrode active material layer containing a negative electrode active material; and an electrolyte layer formed between the positive electrode active material layer and the negative electrode active material layer. In the lithium battery, at least one from among the positive electrode active material layer, the negative electrode active material layer and the electrolyte layer contains a sulfide solid electrolyte material that contains Li, a group 14 or group 15 element, O and S, is substantially free of crosslinking sulfur, and has a $Li_2S$ content no greater than 1 mol %.

Through the use of the above-described sulfide solid electrolyte material, the above configuration allows obtaining a lithium battery that generates a very small amount of hydrogen sulfide.

The invention allows thus obtaining a sulfide solid electrolyte material that generates a very small amount of hydrogen sulfide.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
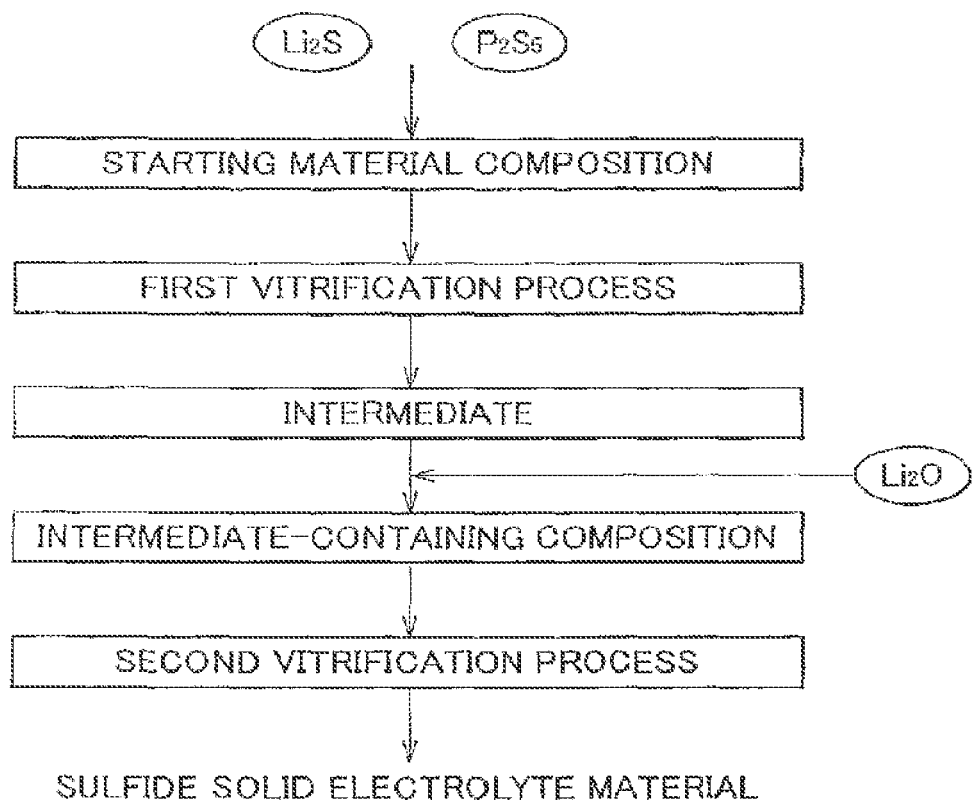
FIG. 1 is a flowchart illustrating as an example a method of producing a sulfide solid electrolyte material according to an embodiment of the invention.

As a result of diligent research directed at solving the above problems, the inventors found that the reasons why a sulfide solid electrolyte material having an ortho composition generates small amounts of hydrogen sulfide were as follows. Specifically, the inventors found that an ortho composition can be obtained in a $Li_2S$—$P_2S_5$ material in a case where starting materials are mixed in a proportion of $Li_2S:P_2S_5=75:25$, on a molar basis, but when the proportion of $Li_2S$ is low, even by a little, a small amount of $S_3P$—$S$—$PS_3$ units ($P_2S_7$ units) is formed and the crosslinking sulfur in the units reacts with water to generate hydrogen sulfide. Conversely, when the proportion of $Li_2S$ is high, even by a little, there remains a small amount of $Li_2S$, which reacts with water to generate hydrogen sulfide. Therefore, the inventors found that adjusting the starting material composition is extremely difficult in terms of obtaining a sulfide solid electrolyte material that generates a very small amount of hydrogen sulfide.

The inventors found also the following. Achieving a completely uniform composition of a glassy sulfide solid electrolyte material is difficult in a $Li_2S$—$P_2S_5$ material, even after having adjusted the starting material composition to an ideal proportion ($Li_2S:P_2S_5=75:25$, on a molar basis). Thus, small amounts of the above-described $Li_2S$ and crosslinking sulfur remain, and can react with water to generate hydrogen sulfide. The inventors found also that even after adjustment of the starting material composition to an ideal proportion, there may be generated about 10% of $Li_4P_2S_6$ units having a non-stoichiometric composition, which may result in the presence of residual $Li_2S$.

Regarding related technologies, the present inventors found that a sulfide solid electrolyte material that generates a very small amount of hydrogen sulfide, and being free of both $Li_2S$ and crosslinking sulfur, can be obtained by dividing into two stages the production of the sulfide solid electrolyte material that was carried out in one single vitrification process, such that, in a first vitrification process, there is produced an intermediate that may have crosslinking sulfur, since $Li_2S$ is completely eliminated ($Li_2S$ is caused to be completely incorporated into the structure of the intermediate), and in a second vitrification process, a compound for cleaving crosslinking sulfur bonds is added to the intermediate, to remove thereby the crosslinking sulfur.

A detailed explanation follows next on the method of producing a sulfide solid electrolyte material, a sulfide solid electrolyte material and a lithium battery according to an embodiment of the invention. The term ortho composition denotes ordinarily the most highly hydrated oxoacid from among the oxoacids that are obtained through hydration of one same oxide. In the sulfide solid electrolyte material having $Li_2S$ according to the present embodiment, however, the ortho composition denotes a composition having a crystal composition with the greatest amount of $Li_2S$ added among the sulfides. In a $Li_2S$—$P_2S_5$ material, for instance, $Li_3PS_4$ corresponds to the ortho composition, such that a sulfide solid electrolyte material of ortho composition is obtained when mixing starting materials in a proportion $Li_2S:P_2S_5=75:25$, on a molar basis.

A method of producing a sulfide solid electrolyte material of an embodiment of the invention will be explained first. The method of producing a sulfide solid electrolyte material according the present embodiment is characterized by having a first vitrification step of vitrifying, by way of a first vitrification process, a starting material composition that is obtained by mixing $Li_2S$ and a sulfide of a group 14 or group 15 element in such a manner that the proportion of $Li_2S$ with respect to the sum total of $Li_2S$ plus the sulfide of a group 14 or group 15 element is smaller than the proportion of $Li_2S$ at which an ortho composition is obtained, to form as a result an intermediate having crosslinking sulfur but no $Li_2S$; and a second vitrification step of eliminating the crosslinking sulfur by vitrifying an intermediate-containing composition resulting from mixing a bond cleaving compound, which cleaves a bond of the crosslinking sulfur, with the intermediate.

In the present embodiment, an intermediate from which $Li_2S$ is removed is formed in the first vitrification step, while the crosslinking sulfur in the intermediate is removed in the second vitrification step. A sulfide solid electrolyte material can be obtained as a result that is free of both $Li_2S$ and crosslinking sulfur. It becomes possible thereby to obtain a highly safe sulfide solid electrolyte material that generates a very small amount of hydrogen sulfide. As pointed out in the section on related art, adjusting a starting material composition was extremely difficult, as described above, when producing a sulfide solid electrolyte material in one single vitrification process, and there were also limits as to how low the amount of generated hydrogen sulfide could be brought. The present embodiment, by contrast, allows obtaining easily a sulfide solid electrolyte material that generates a very small amount of hydrogen sulfide, by dividing the vitrification process into two stages.

FIG. 1 is a flowchart illustrating as an example a method of producing a sulfide solid electrolyte material according to the present embodiment. In FIG. 1, there are prepared firstly $Li_2S$ and $P_2S_5$ (sulfide of a group 14 or group 15 element). The foregoing are then mixed to a ratio $Li_2S:P_2S_5=70:30$ (molar basis), to yield a starting material composition. The proportion of $Li_2S$ with respect to the sum total of $Li_2S$ and $P_2S_5$ is smaller than the proportion (75%) at which the ortho composition is obtained. Next, the starting material composition is vitrified (first vitrification process) by mechanical milling, to yield a $70Li_2S \cdot 30P_2S_5$ glass (intermediate). As described below, the intermediate has crosslinking sulfur but no $Li_2S$. Next, the $70Li_2S \cdot 30P_2S_5$ glass is mixed with $Li_2O$ (bond cleaving compound), to yield an intermediate-containing composition. Next, the intermediate-containing composition is vitrified (second vitrification process) by mechanical milling, to yield a sulfide solid electrolyte material.

Figures 2A, 2B:
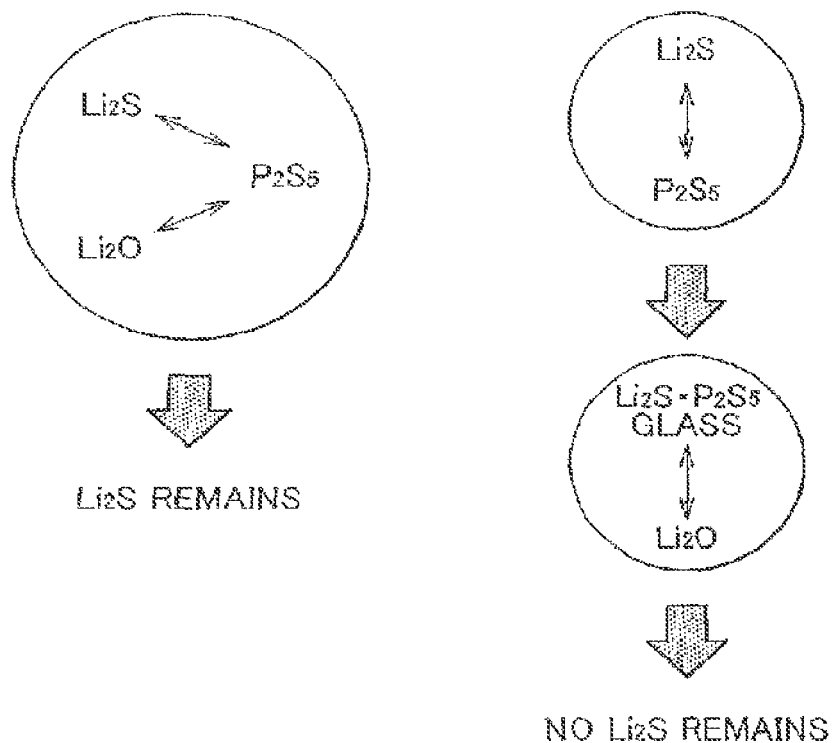
FIGS. 2A and 2B are explanatory diagrams for explaining a method of producing a sulfide solid electrolyte material according to related technologies, and a method of producing a sulfide solid electrolyte material according to an embodiment of the invention.

In Nobuya Machida et al., "Mechano-chemical Synthesis of Lithium Ion Conducting Materials in the System $Li_2O$—$Li_2S$—$P_2S_5$", J. Jpn. Soc. Powder Metallurgy Vol. 51, No. 2, 91-97 and R. Prasada Rao et al., "Oxysulfide glasses $xLi_2O$-$(1-x)(0.6Li_2S$-$0.4P_2S_5)$", Journal of Power Sources 159 (2006) 258-262 cited above, a sulfide solid electrolyte material is produced by single mechanical milling using a mixture of $Li_2S$, $P_2S_5$ and $Li_2O$. In this case, as illustrated in FIG. 2A, $Li_2O$ and $P_2S_5$ react at the same time that $Li_2S$ and $P_2S_5$ react. As a result, there is a high likelihood that a small amount of $Li_2S$ remains in the obtained sulfide solid electrolyte material, and thus a small amount of hydrogen sulfide may be generated, as described in the comparative examples below. In the present embodiment, by contrast, firstly a $Li_2S \cdot P_2S_5$ glass is produced by reacting $Li_2S$ and $P_2S_5$, as illustrated in FIG. 2B. At this time, the proportion between $Li_2S$ and $P_2S_5$ is adjusted to cause $Li_2S$ to disappear completely (to cause the $Li_2S$ to be completely incorporated into the structure of an intermediate). As a result there is produced a $Li_2S \cdot P_2S_5$ glass that may have crosslinking sulfur (for instance, the below-described $P_2S_7$ units). Thereafter, the crosslinking sulfur in the $Li_2S \cdot P_2S_5$ glass is made to react with $Li_2O$. As a result there can be obtained a sulfide solid electrolyte material free of both $Li_2S$ and crosslinking sulfur, so that the amount of generated hydrogen sulfide can be kept very small.

A formula of the reaction that takes place when crosslinking sulfur (for instance, $P_2S_7$ units) in the intermediate is cleaved by a bond cleaving compound (for instance, $Li_2O$), is given below as an example. As the reaction formula below indicates, the crosslinking sulfur S in the $P_2S_7$ unit reacts with $Li_2O$ to form a $PS_3OLi$ unit and a $PS_4Li$ unit, whereupon the crosslinking sulfur disappears. Although omitted in the reaction formula below, the single-bond S in each unit is $S^-$ that has a $Li^+$ counter ion.

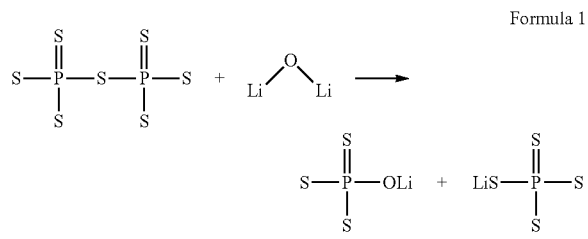

Formula 1

A method of producing a sulfide solid electrolyte material of an embodiment of the present embodiment will be explained step by step. In the present embodiment, the below-described steps are all carried out ordinarily in an inert gas atmosphere (for instance, an Ar gas atmosphere).

The first vitrification step in the present embodiment is a step of vitrifying, by way of a first vitrification process, a starting material composition that is obtained by mixing $Li_2S$ and a sulfide of a group 14 or group 15 element in such a manner that the proportion of $Li_2S$ with respect to the sum total of $Li_2S$ plus the sulfide of a group 14 or group 15 element is smaller than the proportion of $Li_2S$ at which an ortho composition is obtained, to form as a result an intermediate having crosslinking sulfur but no $Li_2S$.

In the present embodiment, $Li_2S$ is completely eliminated in the first vitrification step ($Li_2S$ is caused to be completely incorporated into the structure of the intermediate), as a result of which there is produced an intermediate that may have crosslinking sulfur. As used in the present embodiment, the term "crosslinking sulfur" denotes a crosslinking sulfur in a compound resulting from reacting $Li_2S$ and a sulfide of a group 14 or group 15 element. For example, the crosslinking sulfur in $S_3P-S-PS_3$ units obtained by reacting $Li_2S$ and $P_2S_5$ is a case in point. Such crosslinking sulfur tends to react with water and to generate readily hydrogen sulfide as a result. The feature "having crosslinking sulfur" can be checked based on measurements of Raman spectroscopy spectra. In the case, for instance, of a sulfide solid electrolyte material of a $Li_2S-P_2S_5$ material, the peaks of $S_3P-S-PS_3$ units appear ordinarily at 402 $cm^{-1}$. Accordingly, the presence or absence of the crosslinking sulfur can be determined on the basis of that peak. In sulfide solid electrolyte materials other than $Li_2S-P_2S_5$ material, the presence or absence of crosslinking sulfur can be determined by identifying units having a crosslinking sulfur, and by measuring peaks of such units.

The starting material composition of the present embodiment is explained next. The starting material composition of the present embodiment is a mixture of $Li_2S$ and a sulfide of a group 14 or group 15 element. Preferably, the $Li_2S$ in the starting material composition may have few impurities, since side reactions can be suppressed in that case. Examples of $Li_2S$ synthesis methods are disclosed in, for instance, Japanese Patent Application Publication No. 7-330312 (JP-A-7-330312). Preferably, $Li_2S$ may be purified in accordance with, for instance, the method set forth in WO 2005/040039.

The starting material composition has a sulfide of a group 14 or group 15 element. The group 14 or group 15 element is not particularly limited, buy may be, for instance, P, Si, Ge, As, Sb or the like. Among the foregoing, preferably, the group 14 or group 15 element may be P, Si or Ge, in particular P, since in this case there can be obtained a sulfide solid electrolyte material that generates a small amount of hydrogen sulfide and that has high Li ion conductivity. The sulfide of a group 14 or group 15 element may be, specifically, $P_2S_3$, $P_2S_5$, $SiS_2$, $GeS_2$, $As_2S_3$ or $Sb_2S_3$.

In the present embodiment, the proportions in the starting material composition are adjusted in order to produce an intermediate having crosslinking sulfur but no $Li_2S$. Specifically, the proportion of $Li_2S$ with respect to the sum total of $Li_2S$ and the sulfide of a group 14 or group 15 element is adjusted to be smaller than the proportion of $Li_2S$ at which the ortho composition is obtained. In a case where the sulfide of a group 14 or group 15 element is for instance $P_2S_5$, the proportion of $Li_2S$ at which the ortho composition is obtained is 75% ($Li_2S:P_2S_5=75:25$, on a molar basis). Accordingly, the proportion of $Li_2S$ with respect to the sum total of $Li_2S$ and $P_2S_5$ is adjusted to be smaller than 75%, on a molar basis. In the present embodiment, some $Li_2S$ may remain even if the above $Li_2S$ portion is 75% on a molar basis. That is because it is difficult to achieve a perfectly uniform composition of the glassy sulfide solid electrolyte material, even when adjusting the proportions in the starting material composition to the ideal proportion ($Li_2S:P_2S_5=75:25$, on a molar basis), and there is a chance than a small amount of $Li_2S$ remains in the material. In the present embodiment, preferably, the proportion of $Li_2S$ with respect to the sum total of $Li_2S$ and $P_2S_5$ may be set to be no greater than 74%, more preferably no greater than 73% and in particular, no greater than 72%, on a molar basis, since an intermediate having no $Li_2S$ can be produced more reliably in that case.

If the sulfide of a group 14 or group 15 element is $GeS_2$, the proportion of $Li_2S$ at which the ortho composition is obtained is 66.7% ($Li_2S:GeS_2=66.7:33.3$, on a molar basis). Accordingly, the proportion of $Li_2S$ with respect to the sum total of $Li_2S$ and $GeS_2$ is adjusted to be smaller than 66.7%, on a molar basis. In the present embodiment, preferably, the proportion of $Li_2S$ with respect to the sum total of $Li_2S$ and $GeS_2$ may be set to be no greater than 66%, more preferably no greater than 65% and in particular, no greater than 64%, on a molar basis, since an intermediate having no $Li_2S$ can be produced more reliably in that case. If the sulfide of a group 14 or group 15 element is $SiS_2$, the proportion of $Li_2S$ at which the ortho composition is obtained is 66.7% ($Li_2S:SiS_2=66.7:33.3$, on a molar basis). A preferred $Li_2S$ proportion may be the same as in the case of $GeS_2$.

In the present embodiment, the proportion of $Li_2S$ with respect to the sum total of $Li_2S$ and the sulfide of a group 14 or group 15 element may be, preferably, not lower than the proportion of $Li_2S$ at which a pyro composition is obtained. That is because $MS_x$ that contributes to ion conductivity (M denotes a group 14 or group 15 element) does not form readily when the above proportion of $Li_2S$ is smaller than the proportion of $Li_2S$ at which the pyro composition is obtained. Herein, the term pyro denotes ordinarily the second most hydrated oxoacid from among the oxoacids that are obtained through hydration of one same oxide. In a sulfide solid electrolyte material using $Li_2S$, however, the pyro composition denotes a composition having a crystal composition with the second greatest amount of added $Li_2S$, among the sulfides. The pyro composition can also be defined as a structure resulting from removing one water molecule from the ortho composition, through dehydrative condensation of the ortho composition. In a $Li_2S$—$P_2S_5$ material, for instance, $Li_4P_2S_7$ corresponds to the pyro composition, such that a sulfide solid electrolyte material of pyro composition is obtained when mixing starting materials in a proportion $Li_2S:P_2S_5$=66.7:33.3, on a molar basis. Therefore, the proportion of $Li_2S$ with respect to the sum total of $Li_2S$ and $P_2S_5$ may preferably be not lower than 66.7%, more preferably not lower than 67%, and in particular not lower than 68%, on a molar basis.

In a case where $GeS_2$ is the sulfide of a group 14 or group 15 element, the proportion of $Li_2S$ at which the pyro composition is obtained is 60% ($Li_2S:GeS_2$=60:40, on a molar basis). Therefore, the proportion of $Li_2S$ with respect to the sum total of $Li_2S$ and $GeS_2$ may preferably be not lower than 61%, more preferably not lower than 62%, and in particular not lower than 63%, on a molar basis. In a case where $SiS_2$ is the sulfide of a group 14 or group 15 element, the proportion of $Li_2S$ at which the pyro composition is obtained is 60% ($Li_2S:SiS_2$=60:40, on a molar basis). A preferred $Li_2S$ proportion may be the same as in the case of $GeS_2$.

A first vitrification process according to the present embodiment will be explained next. The first vitrification process of the present embodiment is a process of amorphizing the above-described starting material composition and forming an intermediate having crosslinking sulfur but no $Li_2S$. Examples of the first vitrification process include, for instance, mechanical milling and melt quenching. Preferably, the first vitrification process may be mechanical milling among the foregoing, since mechanical milling can be performed at normal temperature and allows streamlining the production process.

Mechanical milling is not particularly limited, so long as the starting material composition is mixed while being imparted mechanical energy. Examples thereof include, for instance, ball milling, turbo milling, mechanofusion, disc milling. Preferably, mechanical milling may involve ball milling, and in particular planetary ball milling, since in that case the desired intermediate can be obtained with good efficiency.

The mechanical milling conditions are set in such a way so as obtain an intermediate having crosslinking sulfur but no $Li_2S$. If the intermediate is produced by planetary ball milling, for instance, the starting material composition and milling balls are charged into a pot, and milling proceeds at predetermined revolutions for a predetermined time. Ordinarily, greater revolutions translate into a faster generation rate of the intermediate. Likewise, the longer the treatment time, the higher becomes the transformation rate of starting material composition into the intermediate. The revolutions in the planetary ball mill are set, for instance to 200 rpm to 500 rpm. Within that range, preferably, the revolutions may be 250 rpm to 400 rpm. The process time during planetary ball milling ranges for instance from 1 hour to 100 hours. Within that range, preferably, the process time may be 1 hour to 50 hours.

The second vitrification process according to the present embodiment will be explained next. The present step is a step of eliminating the crosslinking sulfur by vitrifying, by way of a second vitrification process, an intermediate-containing composition resulting from mixing a bond cleaving compound, which cleaves a bond of the crosslinking sulfur, with the intermediate.

The intermediate-containing composition of the present embodiment is a mixture of the intermediate obtained in the first vitrification step and the bond cleaving compound that cleaves a bond of the crosslinking sulfur in the intermediate. The bond cleaving compound is not particularly limited, and may be an alkali compound that reacts with crosslinking sulfur, for instance, $Li_2O$, $Li_2O_2$, $Li_3N$, $Na_2O$, $K_2O$, $MgO$ or $CaO$, Preferably, the bond cleaving compound may be $Li_2O$, since the oxygen (O) element in $Li_2O$ can cleave, with good efficiency, the crosslinking sulfur in the intermediate. Further, $Li_2O$ has Li element, and can therefore enhance the Li ion conductivity of the sulfide solid electrolyte material obtained through cleaving of the crosslinking sulfur.

The amount of bond cleaving compound that is added in the second vitrification step is not particularly limited, but, preferably, may be appropriately selected in accordance with, for instance, the reaction point of the bond cleaving compound. In the present embodiment, preferably, the bond cleaving compound may be added in such a proportion as allows obtaining a sulfide solid electrolyte material substantially free of crosslinking sulfur, since in this case there can be suppressed generation of hydrogen sulfide caused by reaction between the crosslinking sulfur and water. The feature "substantially free of crosslinking sulfur" can be checked based on measurements of Raman spectroscopy spectra. In the case, for instance, of a sulfide solid electrolyte material of a $Li_2S$—$P_2S_5$ material, the peaks of $S_3P$—$S$—$PS_3$ units appear ordinarily at 402 cm$^{-1}$. Preferably, therefore, such a peak may fail to be detected. The peak of $PS_4$ units appears ordinarily at 417 cm$^{-1}$. In the present embodiment, preferably, the intensity $I_{402}$ at 402 cm$^{-1}$ may be smaller than the intensity $I_{417}$ at 417 cm$^{-1}$. More specifically, the intensity $I_{402}$ may preferably be no greater than 70% of the intensity $I_{417}$, more preferably no greater than 50%, and yet more preferably no greater than 35%. Whether sulfide solid electrolyte materials other than $Li_2S$—$P_2S_5$ are substantially free or not of crosslinking sulfur can be determined by identifying units having a crosslinking sulfur, and by measuring peaks of such units.

In the present embodiment, preferably, the proportion of the sum total of $Li_2S$ and bond cleaving compound with respect to the sum total of $Li_2S$, sulfide of a group 14 or group 15 element plus bond cleaving compound may be a value equal not lower than the proportion of $Li_2S$ at which the ortho composition is obtained, since in that case a sulfide solid electrolyte material substantially free of crosslinking sulfur can be obtained more reliably. In a case where the sulfide of a group 14 or group 15 element is $P_2S_5$, for instance, the proportion of $Li_2S$ at which the ortho composition is obtained is 75%, as described above. Therefore, the proportion of the sum total of $Li_2S$ and bond cleaving compound (for instance, $Li_2O$) with respect to the sum total of $Li_2S$, $P_2S_5$ and bond cleaving compound (for instance, $Li_2O$) may preferably be no smaller than 75%, more preferably no smaller than 76%, and in particular no smaller than 77%, on a molar basis. The proportion of the sum total of $Li_2S$ and bond cleaving compound (for instance, $Li_2O$) may preferably be no greater than 95%, more preferably no greater than 90%, and in particular no greater than 85%, on a molar basis. That is because the Li ion conductivity of the obtained sulfide solid electrolyte material may drop as the proportion of the bond cleaving compound becomes relatively greater, in a case where the bond cleaving compound is insulating.

If the sulfide of a group 14 or group 15 element is $GeS_2$, for instance, the proportion of $Li_2S$ at which the ortho composition is obtained is 66.7%, as described above.

Therefore, the proportion of the sum total of $Li_2S$ and bond cleaving compound (for instance, $Li_2O$) with respect to the sum total of $Li_2S$, $GeS_2$ and bond cleaving compound (for instance, $Li_2O$) may preferably be not lower than 66.7%, more preferably not lower than 67%, and in particular not lower than 68%, on a molar basis, since in that case a sulfide solid electrolyte material substantially free of crosslinking sulfur can be obtained more reliably. The proportion of the sum total of $Li_2S$ and bond cleaving compound (for instance, $Li_2O$) may preferably be no greater than 95%, more preferably no greater than 90%, and in particular no greater than 85%, on a molar basis. That is because the Li ion conductivity of the obtained sulfide solid electrolyte material may drop as the proportion of the bond cleaving compound becomes relatively greater, in a case where the bond cleaving compound is insulating. If the sulfide of a group 14 or group 15 element is $SiS_2$, the proportion of sulfide of $Li_2S$ at which the ortho composition is obtained is 66.7%. Therefore, a preferred proportion of the sum total of $Li_2S$ and bond cleaving compound (for instance, $Li_2O$) is the same as that for $GeS_2$.

When using $Li_2O$ as the bond cleaving compound, in particular, the Li ion conductivity of the obtained sulfide solid electrolyte material can be increased by adjusting the addition amount of $Li_2O$, because Li element in $Li_2O$ can contribute to enhancing Li ion conductivity. Herein, $I_4$ denotes the Li ion conductivity of the sulfide solid electrolyte material in a case where the proportion of the sum total of $Li_2S$ and $Li_2O$ with respect to the sum total of $Li_2S$, sulfide of a group 14 or group 15 element and $Li_2O$ is the proportion of $Li_2S$ at which the ortho composition is obtained. In the present embodiment, preferably, the proportion of the sum total of $Li_2S$ and $Li_2O$ with respect to the sum total of $Li_2S$, sulfide of a group 14 or group 15 element and $Li_2O$ may be set to the proportion at which there is obtained a sulfide solid electrolyte material having a Li ion conductivity greater than $I_4$. The lower limit of the sum total of $Li_2S$ and $Li_2O$ is a value that exceeds the proportion of $Li_2S$ at which the ortho composition is obtained. The upper limit of the proportion of the sum total of $Li_2S$ and $Li_2O$ can be decided through appropriate experimentation. In this case, there is ordinarily obtained a sulfide solid electrolyte material having a $Li_2O$ phase.

The second vitrification process according to the present embodiment will be explained next. The second vitrification process of the present embodiment is a process of amorphizing the above-described intermediate-containing composition and eliminating the crosslinking sulfur. Examples of the second vitrification process include, for instance, mechanical milling and melt quenching. Preferably, the second vitrification process may be mechanical milling among the foregoing, since mechanical milling can be performed at normal temperature and allows streamlining the production process.

Mechanical milling is not particularly limited, so long as the intermediate-containing composition is mixed while being imparted mechanical energy. Examples thereof include, for instance, ball milling, turbo milling, mechanofusion, disc milling. Preferably, mechanical milling may involve ball milling, in particular planetary ball milling, since in this case a desired sulfide solid electrolyte material can be obtained with good efficiency.

The mechanical milling conditions are set in such a way so as allow obtaining a desired sulfide solid electrolyte material. If the sulfide solid electrolyte material is produced by planetary ball milling, for instance, the intermediate-containing composition and milling balls are charged into a pot, and milling proceeds at predetermined revolutions for a predetermined time. Ordinarily, greater revolutions translate into a faster generation rate of the sulfide solid electrolyte material. Likewise, the longer the treatment time, the higher becomes the transformation rate of intermediate-containing composition into the sulfide solid electrolyte material. The revolutions in the planetary ball mill are set, for instance to 200 rpm to 500 rpm. Within that range, preferably, the revolutions may be 250 rpm to 400 rpm. The process time during planetary ball milling ranges for instance from 1 hour to 100 hours. Within that range, preferably, the process time may be 1 hour to 50 hours.

The present embodiment allows providing a sulfide solid electrolyte material characterized by being obtained through the above-described first vitrification step and second vitrification step.

The sulfide solid electrolyte material according to the present embodiment is explained next. The sulfide solid electrolyte material according to the present embodiment contains Li, a group 14 or group 15 element, O and S, is substantially free of crosslinking sulfur, and the content of $Li_2S$ is no greater than 1 mol %.

In the present embodiment, the $Li_2S$ content is low, and hence there can be obtained a sulfide solid electrolyte material that generates a very small amount of hydrogen sulfide.

The sulfide solid electrolyte material according to the present embodiment has a characteristic in which the $Li_2S$ content thereof is no greater than 1 mol %, as described above. Preferably, the $Li_2S$ content may be smaller than that. Specifically, the $Li_2S$ content may preferably be no greater than 0.9 mol %, and in particular no greater than 0.8 mol %. The $Li_2S$ content can be calculated on the basis of XPS results. Specifically, the XPS spectrum of $S_{2p}$ is measured, and the $Li_2S$ content can be quantified by separating the obtained peaks. $Li_2S$ peaks are detected ordinarily around 160 eV to 162 eV (2p1/2:161.5 eV, 2p3/2:160.3 eV). Therefore, the $Li_2S$ content can be calculated on the basis of surface area ratios, after peak separation. The peak separation conditions may involve, for instance, a surface area ratio of $S_{2p1/2}:S_{2p3/2}=1:2$, and a shift interval of 1.3 eV. For peak fitting there can be selected, for instance, three components, namely $Li_2S$, the sulfide solid electrolyte material of ortho composition (for instance, $Li_3PS_4$) and unconventional component.

The $Li_2S$ content may also be calculated on the basis of tests in which there is measured a predetermined amount of hydrogen sulfide. Specifically, 100 mg of sulfide solid electrolyte material are weighed, in an inert gas atmosphere, and are placed in a sealed 1755 cc desiccator (air atmosphere, temperature 25° C., humidity 50%), whereupon the generation amount of hydrogen sulfide can be measured using a hydrogen sulfide sensor (GX-2009, by Riken Keiki). The $Li_2S$ content can be calculated thereafter on the basis of the maximum value of the measured amount of generated hydrogen sulfide (cc/g).

The sulfide solid electrolyte material of the present embodiment is characterized by being substantially free of crosslinking sulfur. The feature "substantially free of crosslinking sulfur" denotes the same as set forth in "A. Method of producing a sulfide solid electrolyte material" above.

The sulfide solid electrolyte material according to the present embodiment contains Li, a group 14 or group 15 element, O and S. The group 14 or group 15 element is not particularly limited. Preferably, the group 14 or group 15 element may be, for instance, P, Si or Ge, in particular P. The sulfide solid electrolyte material of the present embodiment is ordinarily a glassy sulfide solid electrolyte material. Preferably, the sulfide solid electrolyte material of the present embodiment may be obtained through vitrification of $Li_2S$, a sulfide of a group 14 or group 15 element an a bond cleaving compound. The features of the sulfide of a group 14 or group 15 element and the bond cleaving compound are as set forth in "A. Method of producing a sulfide solid electrolyte material" above. Preferably, the sulfide solid electrolyte material according to the present embodiment may be obtained, in particular, through vitrification of $Li_2S$, $P_2S_5$ and $Li_2°$, since in this case there can be obtained a sulfide solid electrolyte material that generates a very small amount of hydrogen sulfide and that has good Li ion conductivity.

Preferably, the sulfide solid electrolyte material according to the present embodiment may have a $Li_2O$ phase, since in this case there can be obtained a sulfide solid electrolyte material having yet better Li ion conductivity. The feature "having a $Li_2O$ phase" can be checked, for instance, on the basis of X-ray diffraction (XRD) measurements.

Preferably, the sulfide solid electrolyte material according to the present embodiment may have a high Li ion conductivity value. The Li ion conductivity at room temperature may preferably be for instance not lower than $10^{-5}$ S/cm, more preferably not lower than $10^{-4}$ S/cm. The sulfide solid electrolyte material according to the present embodiment is ordinarily in a powder state, the average size of which ranges, for instance, from 0.1 µm to 50 µm. Uses of the sulfide solid electrolyte material include, for instance, lithium batteries.

A lithium battery according to the present embodiment will be explained next. The lithium battery according to the present embodiment is a lithium battery having: a positive electrode active material layer containing a positive electrode active material; a negative electrode active material layer containing a negative electrode active material; and an electrolyte layer formed between the positive electrode active material layer and the negative electrode active material layer; wherein at least one from among the positive electrode active material layer, the negative electrode active material layer and the electrolyte layer contains the above-described sulfide solid electrolyte material.

The present embodiment allows achieving a lithium battery having a very small amount of generated hydrogen sulfide, through the use of the above-described sulfide solid electrolyte material.

Figure 3:
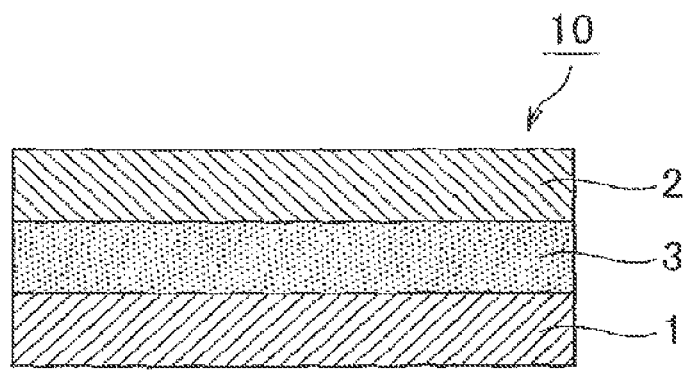
FIG. 3 is a schematic cross-sectional diagram illustrating an example of a power generation element in a lithium battery according to the an embodiment of the invention.

FIG. 3 is a schematic cross-sectional diagram illustrating an example of a power generation element in a lithium battery according to the present embodiment. The power generation element 10 illustrated in FIG. 3 has a positive electrode active material layer 1 containing a positive electrode active material; a negative electrode active material layer 2 containing a negative electrode active material; and an electrolyte layer 3 formed between the positive electrode active material layer 1 and the negative electrode active material layer 2. As a significant characterizing feature of the present embodiment, at least one from among the positive electrode active material layer 1, the negative electrode active material layer 2 and the electrolyte layer 3 contains the above-described sulfide solid electrolyte material. Various configurations of the lithium battery according to the present embodiment will be explained next.

The electrolyte layer of the present embodiment will be explained first. The electrolyte layer of the present embodiment is a layer formed between the positive electrode active material layer and the negative electrode active material layer. The electrolyte layer is not particularly limited so long as it can conduct Li ions, although preferably, the electrolyte layer may be a solid electrolyte layer of a solid electrolyte material, since in this case there can be obtained a highly safe lithium battery (all-solid-state battery). In the present embodiment, preferably, the solid electrolyte layer may contain the above-described sulfide solid electrolyte material. The proportion of the sulfide solid electrolyte material in the solid electrolyte layer may be, for instance, 10 vol % to 100 vol %, and may be, preferably, 50 vol % to 100 vol % within that range. In the present embodiment, the solid electrolyte layer may preferably have, in particular, only the sulfide solid electrolyte material, since in this case there can be obtained a lithium battery that generates a small amount of hydrogen sulfide. The thickness of the solid electrolyte layer may be, for instance, 0.1 µm to 1000 µm, and may be, preferably, 0.1 µm to 300 µm within that range. The method of forming the solid electrolyte layer may involve, for instance, compression molding of the solid electrolyte material.

The electrolyte layer in the present embodiment may be a layer having an electrolyte solution. A high-output lithium battery can be obtained by using an electrolyte solution. In this case, ordinarily, at least one from among the positive electrode active material layer and the negative electrode active material layer contains the above-described sulfide solid electrolyte material. The electrolyte solution contains ordinarily a lithium salt and an organic solvent (non-aqueous solvent). Examples of the lithium salt include, for instance, inorganic lithium salts such as $LiPF_6$, $LiBF_4$, $LiClO_4$ or $LiAsF_6$; and organic lithium salts such as $LiCF_3SO_3$, $LiN(CF_3SO_2)_2$, $LiN(C_2F_5SO_2)_2$ or $LiC(CF_3SO_2)_3$. Examples of the organic solvent include, for instance, ethylene carbonate (EC), propylene carbonate (PC), dimethyl carbonate (DMC), diethyl carbonate (DEC), ethyl methyl carbonate (EMC) or butylene carbonate.

The positive electrode active material layer of the present embodiment will be explained next. The positive electrode active material layer of the present embodiment is a layer that contains at least a positive electrode active material, and that may contain also, as the case may require, at least one from among a solid electrolyte material, a conductivity-imparting material and a binder. In the present embodiment, preferably, the solid electrolyte material in the positive electrode active material layer may be, in particular, the above-described sulfide solid electrolyte material, since in this case there can be obtained a lithium battery that generates a very small amount of hydrogen sulfide. The proportion of sulfide solid electrolyte material in the positive electrode active material layer varies depending on the type of the lithium battery, but may fall, preferably, within a range from 0.1 vol % to 80 vol %, and further, within that range, from 1 vol % to 60 vol %, and in particular from 10 vol % to 50 vol %. Examples of the positive electrode active material include, for instance, $LiCoO_2$, $LiMnO_2$, $Li_2NiMn_3O_8$, $LiVO_2$, $LiCrO_2$, $LiFePO_4$, $LiCoPO_4$, $LiNiO_2$ and $LiNi_{1/3}CO_{1/3}Mn_{1/3}O_2$.

The positive electrode active material layer in the present embodiment may further contain a conductivity-imparting material. The conductivity of the positive electrode active material layer can be enhanced through addition of the conductivity-imparting material. Examples of the conductivity-imparting material include, for instance, acetylene black, Ketjen black, carbon fibers and the like. The positive electrode active material layer may contain a binder. Examples of binder types include, for instance, fluorine-containing binders. Preferably, the thickness of the positive electrode active material layer may range, for instance, from 0.1 µm to 1000 µm.

The negative electrode active material layer of the present embodiment will be explained next. The negative electrode active material layer of the present embodiment is a layer that contains at least a negative electrode active material, and that may contain also, as the case may require, at least one from among a solid electrolyte material, a conductivity-imparting material and a binder. In the present embodiment, preferably, the solid electrolyte material in the negative electrode active material layer may be, in particular, the above-described sulfide solid electrolyte material, since in this case there can be obtained a lithium battery that generates a very small amount of hydrogen sulfide. The proportion of sulfide solid electrolyte material in the negative electrode active material layer varies depending on the type of the lithium battery, but may fall, preferably, within a range from 0.1 vol % to 80 vol %, and further, within that range, from 1 vol % to 60 vol %, and in particular from 10 vol % to 50 vol %. Further examples of the negative electrode active material include, for instance, a metal active material and a carbon active material. Examples of the metal active material include, for instance, In, Al, Si and Sn. Examples of the carbon active material include, for instance, mesocarbon microbeads (MCMB), highly oriented pyrolytic graphite (HOPG), hard carbon and soft carbon. The conductivity-imparting material and the binder used in the negative electrode active material layer are the same as those in the above-described positive electrode active material layer. Preferably, the thickness of the negative electrode active material layer may range, for instance, from 0.1 μm to 1000 μm.

The lithium battery according to the present embodiment has at least the above-described positive electrode active material layer, the electrolyte layer and the negative electrode active material layer. Ordinarily, the lithium battery also has a positive electrode collector that collects current in the positive electrode active material layer, and a negative electrode collector that collects current in the negative electrode active material. Examples of the material of the positive electrode collector include, for instance, stainless steel (SUS), aluminum, nickel, iron, titanium and carbon, and may be, preferably, SUS, and more preferably SUS among the foregoing. Examples of the material of the negative electrode current collector include SUS, copper, nickel or carbon, and may be, preferably, SUS, among the foregoing. Preferably, the thickness, shape and so forth of the positive electrode collector and the negative electrode collector may be appropriately selected in accordance with, for instance, the use of the lithium battery. The battery case used in the present embodiment may be a battery case used in ordinary lithium batteries. Examples of the battery case include, for instance, battery cases made of SUS. In a case where the lithium battery according to the present embodiment is an all-solid-state battery, the power generation element may be formed within an insulating ring.

The lithium battery according to the present embodiment may be a primary battery or a secondary battery. Preferably, the lithium battery may be a secondary battery, since in this case the battery can be charged and discharged repeatedly, and is thus useful, for instance, as a vehicle-mounted battery. Examples of the form of the lithium battery of the present embodiment include, for instance, coin forms, laminate forms, tubular forms, square forms and the like.

The method of producing the lithium battery according to the present embodiment is not particularly limited, so long as the above-described lithium battery can be obtained, and there may be used the same methods as used for producing ordinary lithium batteries. In a case where, for instance, the lithium battery according the present embodiment is an all-solid-state battery, an example of the production method thereof may involve sequentially pressing a material that makes up the positive electrode active material layer, a material that makes up the solid electrolyte layer, and a material that makes up the negative electrode active material layer, to produce thereby a power generation element. The power generation element is stuffed then into a battery case, and the latter is crimped. The present embodiment allows providing also a positive electrode active material layer, a negative electrode active material layer and a solid electrolyte layer that are characterized by containing the above-described sulfide solid electrolyte material.

The invention, is not limited to the above embodiments. The foregoing embodiments are merely illustrative in nature. Thus, the technical scope of the embodiments encompasses any configuration that has substantially the same features as those of the technical idea according to the embodiments, and set forth in the claims, and that elicits substantially the same effect as the technical idea.

Specific examples of the invention are explained next.

Example 1

Lithium sulfide ($Li_2S$) and phosphorus pentasulfide ($P_2S_5$) were used as starting materials. Powders of the foregoing were weighed to a mole ratio of $Li_2S:P_2S_5=70:30$, in a glove box under an argon atmosphere, and were mixed in an agate mortar, to yield 1 g of a starting material composition. Next, the obtained 1 g of starting material composition was placed in a 45 ml zirconia pot, into which there were further charged zirconia balls (Φ10 mm, 10 balls), and the pot was sealed completely. The pot was fitted to a planetary ball mill, and mechanical milling was performed for 20 hours at table revolutions of 370 rpm, to obtain an intermediate ($70Li_2S \cdot 30P_2S_5$ glass) of a sulfide solid electrolyte material. Next, lithium oxide ($Li_2O$) was added to the obtained intermediate, to a mole ratio of x=0.17 in the composition $xLi_2O \cdot (1-x)(70Li_2S \cdot 30P_2S_5)$. The whole was subjected to mechanical milling for 40 hours in the same way as above, at table revolutions of 370 rpm, to obtain a sulfide solid electrolyte material ($17Li_2O \cdot 58Li_2S \cdot 25P_2S_5$ glass).

Example 2

A sulfide solid electrolyte material ($20Li_2O \cdot 56Li_2S \cdot 24P_2S_5$ glass) was obtained in the same way as in Example 1, but herein lithium oxide ($Li_2O$) was added to a x=0.20 mole ratio in the composition $xLi_2O \cdot (1-x)(70Li_2S \cdot 30P_2S_5)$.

Example 3

A sulfide solid electrolyte material ($25Li_2O \cdot 52.5Li_2S \cdot 22.5P_2S_5$ glass) was obtained in the same way as in Example 1, but herein lithium oxide ($Li_2O$) was added to a x=0.25 mole ratio in the composition $xLi_2O \cdot (1-x)(70Li_2S \cdot 30P_2S_5)$.

Comparative Example 1

Lithium sulfide ($Li_2S$), phosphorus pentasulfide ($P_2S_5$) and lithium oxide ($Li_2O$) were used as starting materials. Powders of the foregoing were weighed to a mole ratio of x=0.17 in a composition $xLi_2O \cdot (1-x)(70Li_2S \cdot 30P_2S_5)$, in a glove box under an argon atmosphere, and were mixed in an agate mortar, to yield 1 g of a starting material composition. Next, the obtained 1 g of starting material composition was placed in a 45 ml zirconia pot, into which there whether further charged zirconia balls (Φ10 mm, 10 balls), and the pot was sealed completely. The pot was fitted to a planetary ball mill, and mechanical milling was performed for 40 hours at table revolutions of 370 rpm, to obtain an intermediate (17$Li_2$O.58$Li_2$S.25$P_2S_5$ glass) of a sulfide solid electrolyte material.

Comparative Example 2

A sulfide solid electrolyte material (20$Li_2$O.56$Li_2$S.24$P_2S_5$ glass) was obtained in the same way as in Comparative example 1, but modified herein to an x=0.20 mole ratio in the composition x$Li_2$O.(1-x)(70$Li_2$S.30$P_2S_5$).

Comparative Example 3

A sulfide solid electrolyte material (25$Li_2$O.52.5$Li_2$S.22.5$P_2S_5$ glass) was obtained in the same way as in Comparative example 1, but modified herein to an x=0.25 mole ratio in the composition x$Li_2$O.(1-x)(70$Li_2$S.30$P_2S_5$).

Comparative Example 4

Lithium sulfide ($Li_2$S) and phosphorus pentasulfide ($P_2S_5$) were used as starting materials. Powders of the foregoing were weighed to a mole ratio of $Li_2$S:$P_2S_5$=75:25, in a glove box under an argon atmosphere, and were mixed in an agate mortar, to yield 1 g of a starting material composition. Next, the obtained 1 g of starting material composition was placed in a 45 ml zirconia pot, into which there whether further charged zirconia balls (Φ10 mm, 10 balls), and the pot was sealed completely. The pot was fitted to a planetary ball mill, and mechanical milling was performed for 40 hours at table revolutions of 370 rpm, to obtain a sulfide solid electrolyte material (75$Li_2$S.25$P_2S_5$ glass).

Figure 4:
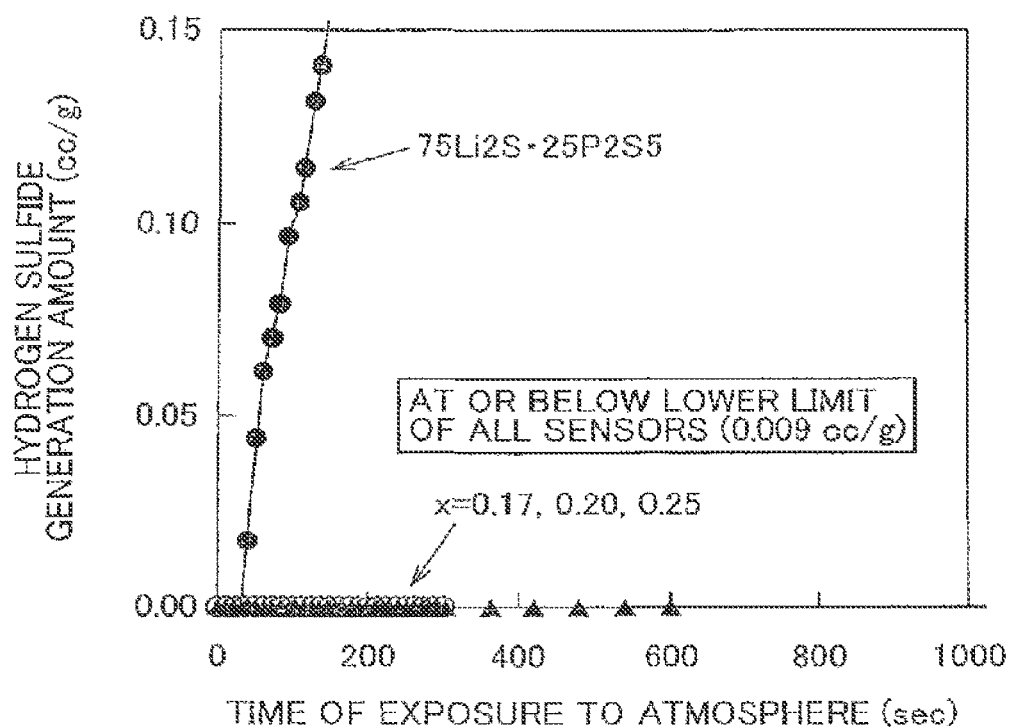
FIG. 4 shows measurement results of amount of hydrogen sulfide generated by sulfide solid electrolyte materials obtained in Examples 1 to 3.
Figure 5:
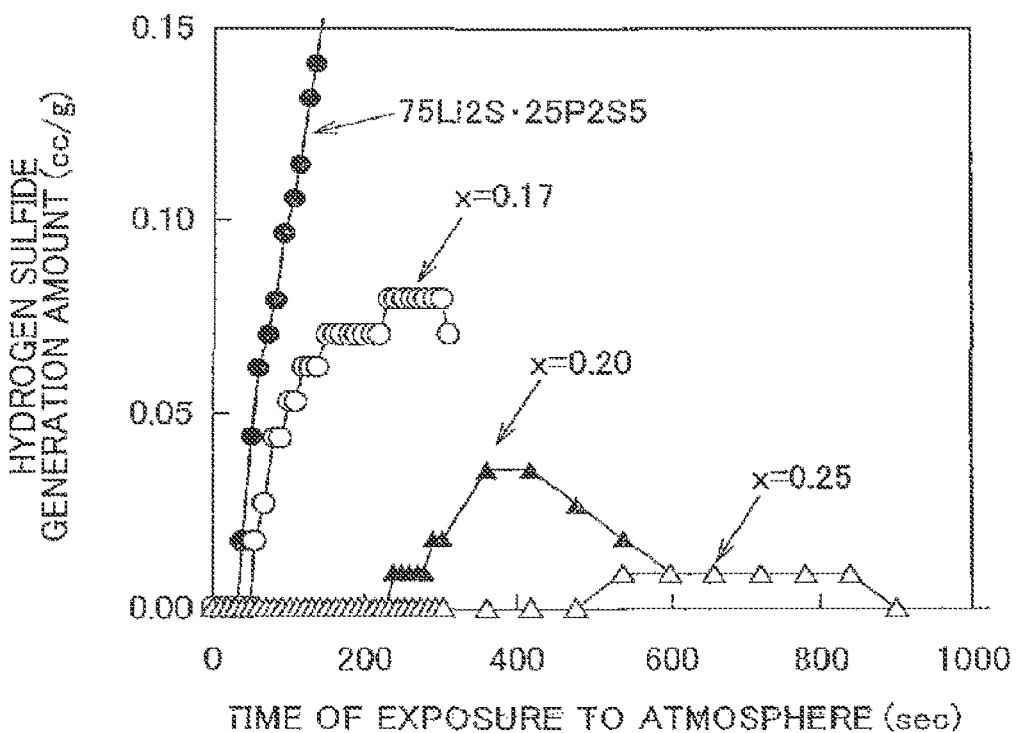
FIG. 5 shows measurement results of amount of hydrogen sulfide generated by sulfide solid electrolyte materials obtained in Comparative examples 1 to 4.

(Measurement of the amount of generated hydrogen sulfide) Hydrogen sulfide generation amounts were measured using the sulfide solid electrolyte materials obtained in Examples 1 to 3 and Comparative examples 1 to 4. The generation amount of hydrogen sulfide was measured as follows. Specifically, 100 mg of the powder of sulfide solid electrolyte material were weighed, in an inert gas atmosphere, and were placed in a sealed 1755 cc desiccator (air atmosphere, temperature 25° C., humidity 50%), whereupon the generation amount of hydrogen sulfide was measured using a hydrogen sulfide sensor (GX-2009, by Riken Keiki). The results are illustrated in FIGS. 4 and 5. In Examples 1 to 3, the generation amount of hydrogen sulfide was no greater than the detection limit (0.009 cc/g) of the sensor, as illustrated in FIG. 4. The results for 75$Li_2$S.25$P_2S_5$ illustrated in FIG. 4 are those of Comparative example 4, depicted for reference. By contrast, generation of hydrogen sulfide was observed in Comparative examples 1 to 4, as illustrated in FIG. 5.

Figure 6:
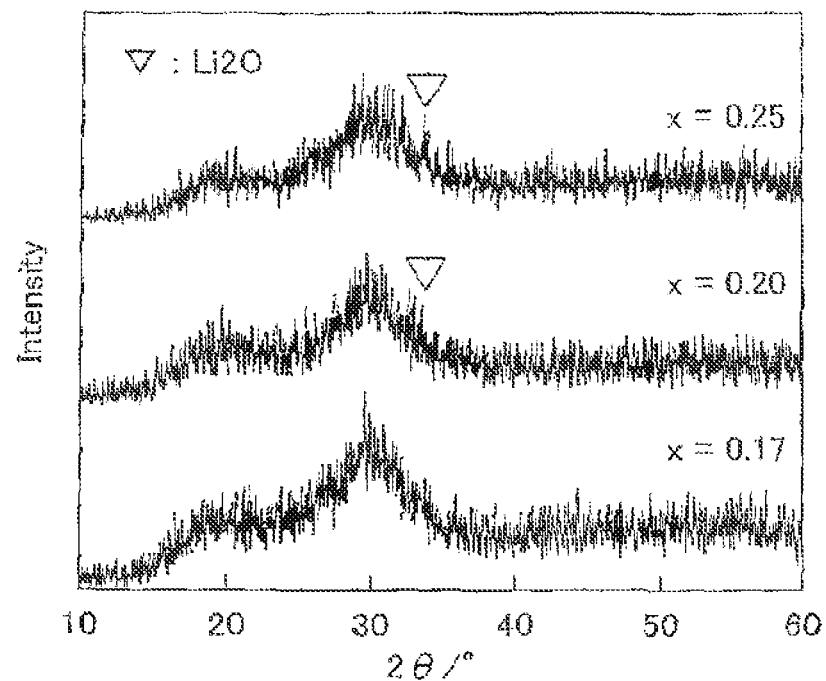
FIG. 6 shows measurement results of X-ray diffraction of sulfide solid electrolyte materials obtained in Examples 1 to 4.
Figure 7:
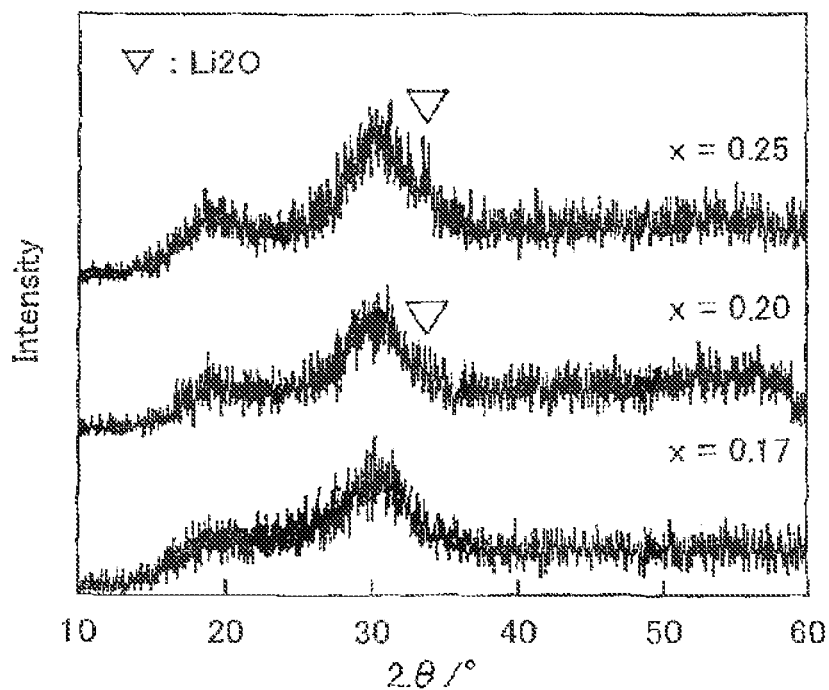
FIG. 7 shows measurement results of X-ray diffraction of sulfide solid electrolyte materials obtained in Comparative examples 1 to 3.

X-ray diffraction measurements were carried out using the sulfide solid electrolyte materials obtained in Examples 1 to 3 and Comparative examples 1 to 3. The results are illustrated in FIGS. 6 and 7. As shown in FIG. 6, the sum total of $Li_2$O and $Li_2$S in Example 1 was 75 mol %, and hence no $Li_2$O peak was detected. In Example 2 and Example 3, by contrast, the sum total of $Li_2$O and $Li_2$S exceeded 75 mol %, and hence a $Li_2$O peak was detected. As shown in FIG. 7, the sum total of $Li_2$O and $Li_2$S in Comparative example 1 was 75 mol %, and hence no $Li_2$O peak was detected. In Comparative example 2 and Comparative example 3, by contrast, the sum total of $Li_2$O and $Li_2$S exceeded 75 mol %, and hence a $Li_2$O peak was detected. The $Li_2$O peak in Example 2 was somewhat sharper than the $Li_2$O peak in Comparative example 2. Likewise, the $Li_2$O peak in Example 3 was somewhat sharper than the $Li_2$O peak in Comparative example 3. Presumably, this is attributable to the high-efficiency reaction between $Li_2$S and $Li_2$O in the intermediate, since the vitrification process in the examples is divided into two stages.

Figure 8:
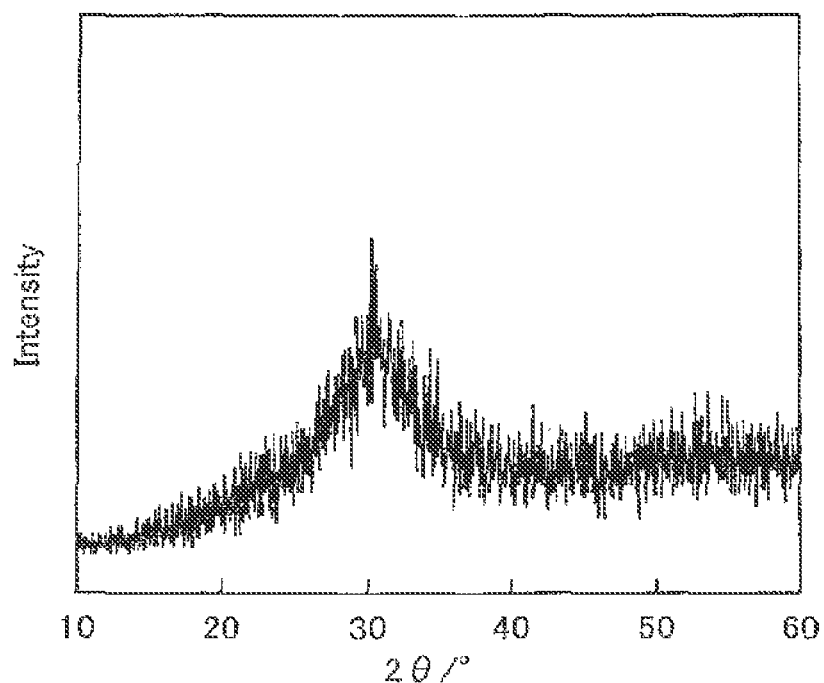
FIG. 8 shows measurement results of X-ray diffraction of a sulfide solid electrolyte material obtained in Comparative example 4.

An X-ray diffraction measurement was performed on the sulfide solid electrolyte material obtained in Comparative example 4. The results are illustrated in FIG. 8. As illustrated in FIG. 8, no $Li_2$S peaks were observed by X-ray diffraction measurement. The results of FIG. 5, however, indicate the amount of generated hydrogen sulfide in Comparative example 4 was greater than in other comparative examples. This suggests a high likelihood of presence of $Li_2$S undetectable by X-ray diffraction measurement.

Figure 9:
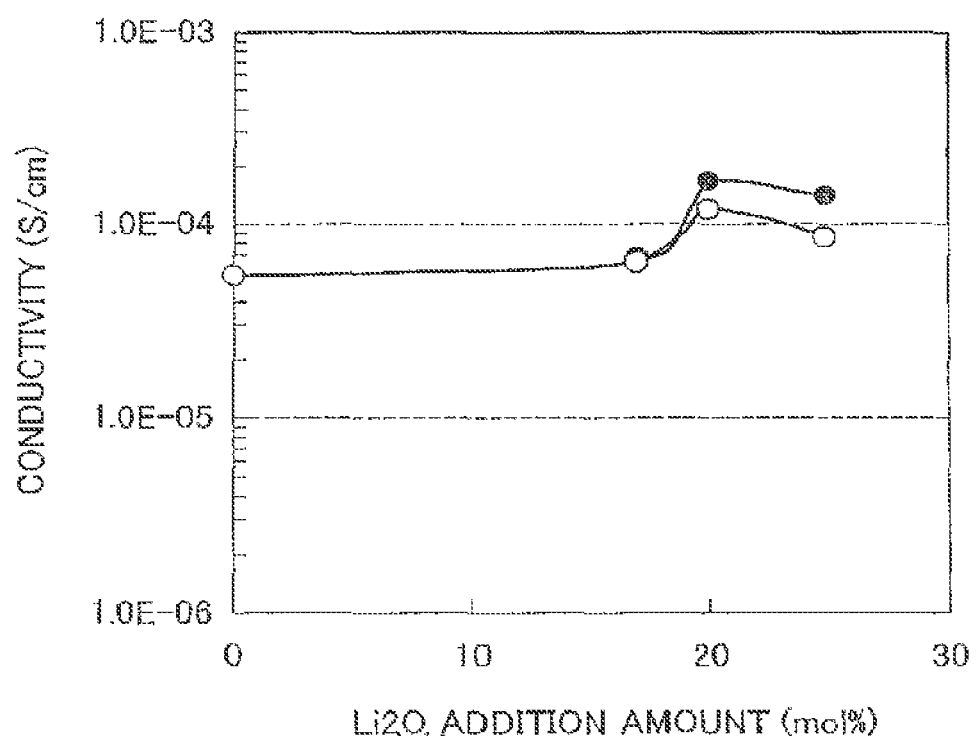
FIG. 9 shows measurement results of Li ion conductivity of sulfide solid electrolyte materials obtained in Examples 1 to 3 and Comparative examples 1 to 4.
Figure 10:
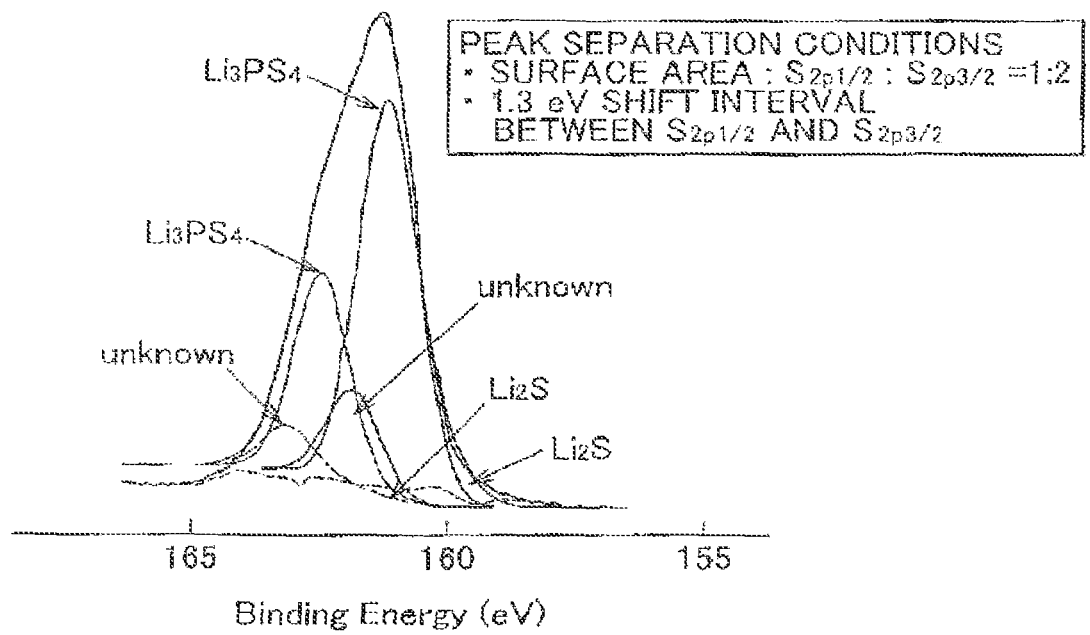
FIG. 10 shows measurement results of X-ray photoelectron spectroscopy of a sulfide solid electrolyte material obtained in Comparative example 1.
Figure 11:
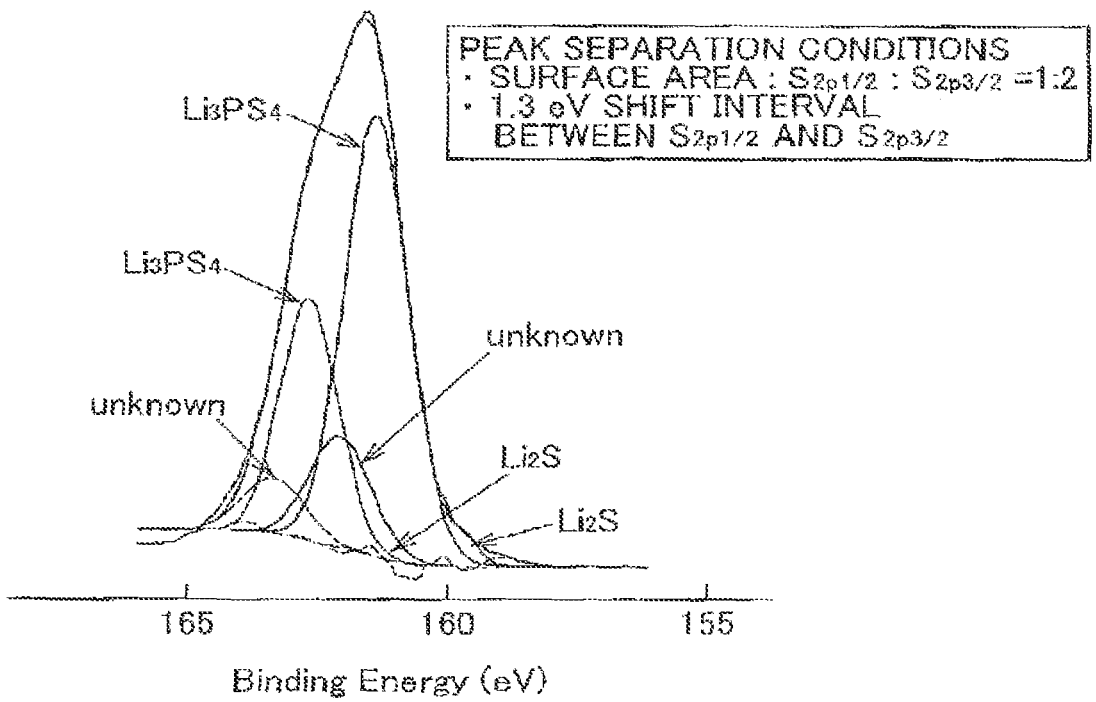
FIG. 11 shows measurement results of X-ray photoelectron spectroscopy of a sulfide solid electrolyte material obtained in Comparative example 2.
Figure 12:
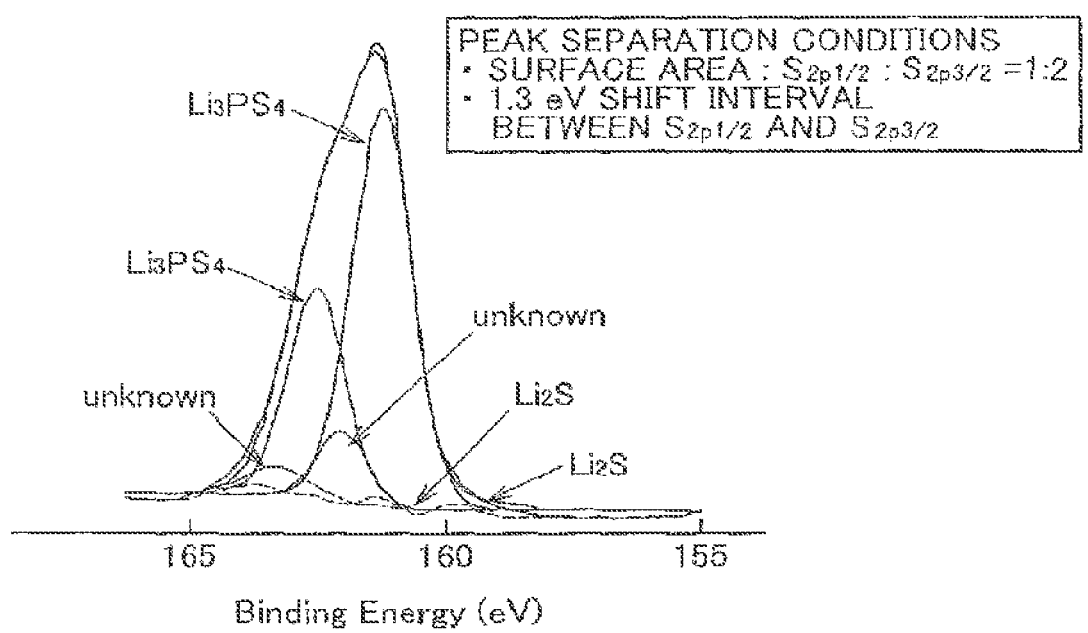
FIG. 12 shows measurement results of X-ray photoelectron spectroscopy of a sulfide solid electrolyte material obtained in Comparative example 3.
Figure 13:
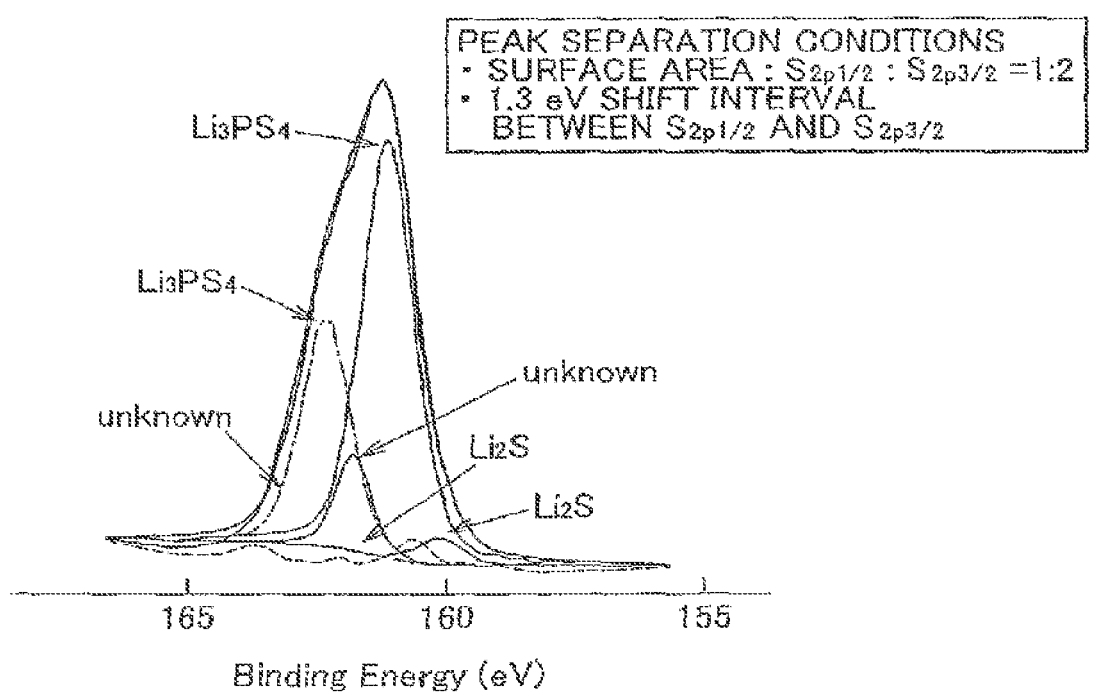
FIG. 13 shows measurement results of X-ray photoelectron spectroscopy of a sulfide solid electrolyte material obtained in Comparative example 4.

Li ion conductivity measurements were carried out using the sulfide solid electrolyte materials obtained in Examples 1 to 3 and Comparative examples 1 to 4. Li ion conductivity was measured as follows. A powder of the sulfide solid electrolyte material was pelletized, and Li ion conductivity was measured at room temperature in accordance with an AC impedance method. The results are illustrated in FIG. 9. As illustrated in FIG. 9, Li ion conductivity was higher in Examples 1 to 3 than in Comparative examples 1 to 3. Li ion conductivity exhibited a maximum, with a value of $1.6 \times 10^{-4}$ S/cm, in the vicinity of Example 2 ($Li_2$O=20 mol %). By contrast, Li ion conductivity in Comparative example 2 was $1.2 \times 10^{-4}$ S/cm. Example 2 exhibited thus about 1.3 times the Li ion conductivity of Comparative example 2.

X-ray photoelectron spectroscopy measurements were carried out using the sulfide solid electrolyte materials obtained Comparative examples 1 to 4. The results are given FIGS. 10 to 13. As FIGS. 10 to 13 show, $Li_2$S undetectable by X-ray diffraction measurement was detected by XPS. Measurement of the $Li_2$S content according to the above-described peak separation conditions revealed that the $Li_2$S content in Comparative example 1 was 3 mol %, the $Li_2$S content in Comparative example 2 was 2 mol %, the $Li_2$S content in Comparative example 3 was 1.5 mol %, and the $Li_2$S content in Comparative example 4 was 4.7 mol %.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

The invention claimed is:
1. A sulfide solid electrolyte material, comprising:
Li, a group 14 or group 15 element, O and S; and
wherein a $Li_2$S content of the sulfide solid electrolyte material is no greater than 1 mol %, and
wherein, when a Raman spectroscopy spectra of the sulfide solid electrolyte material is measured, a peak corresponding to a crosslinking sulfur is not detected.
2. The sulfide solid electrolyte material according to claim 1, wherein said group 14 or group 15 element is P.
3. The sulfide solid electrolyte material according to claim 1, wherein the sulfide solid electrolyte material is produced by vitrifying $Li_2$S, $P_2S_5$ and $Li_2$O.

4. The sulfide solid electrolyte material according to claim 3, wherein said $Li_2O$ forms a phase.

5. A lithium battery, comprising:
a positive electrode active material layer containing a positive electrode active material;
a negative electrode active material layer containing a negative electrode active material; and
an electrolyte layer formed between said positive electrode active material layer and said negative electrode active material layer,
wherein at least one from among said positive electrode active material layer, said negative electrode active material layer and said electrolyte layer contain the sulfide solid electrolyte material according to claim 1.

* * * * *